United States Patent [19]
Wieland et al.

[11] Patent Number: 5,480,009
[45] Date of Patent: Jan. 2, 1996

[54] BRAKE SYSTEM WITH TWO INDEPENDENT MECHANICAL BRAKES

[75] Inventors: Dieter Wieland; Herbert Armbruster, both of Remseck; Gerhard Meyer, Ludwigsburg, all of Germany

[73] Assignee: Andreas Stihl, Waiblingen, Germany

[21] Appl. No.: 303,375

[22] Filed: Sep. 9, 1994

[51] Int. Cl.⁶ ............................ F16D 51/00; B23D 57/02
[52] U.S. Cl. ........................ 188/77 W; 188/78; 188/105; 30/382
[58] Field of Search ...................... 188/78, 77 R, 188/77 W, 105, 110, 166, 168; 301/382, 383

[56] References Cited

U.S. PATENT DOCUMENTS

| | | | |
|---|---|---|---|
| 3,310,136 | 3/1967 | Bricker et al. | 188/77 W |
| 4,282,958 | 8/1981 | Zindler | 192/17 R |
| 4,594,780 | 6/1986 | Schliemann et al. | 30/382 |
| 4,680,862 | 7/1987 | Wieland et al. | 30/381 |
| 4,683,660 | 8/1987 | Schurr | 30/382 |
| 5,159,996 | 11/1992 | LeBlanc | 188/77 R |

FOREIGN PATENT DOCUMENTS

| | | |
|---|---|---|
| 1091215 | 10/1960 | Germany . |
| 3932137 | 5/1980 | Germany . |
| 8002677 | 5/1980 | Germany . |
| 3150769 | 6/1983 | Germany . |
| 3616653 | 12/1988 | Germany . |
| 3722629 | 1/1989 | Germany . |
| 3742163 | 6/1989 | Germany . |
| 3806988 | 9/1989 | Germany . |
| 3419152 | 5/1992 | Germany . |
| 1751834 | 7/1989 | U.S.S.R. . |

*Primary Examiner*—Mark T. Le
*Assistant Examiner*—Peter M. Poon
*Attorney, Agent, or Firm*—Robert W. Becker & Associates

[57] ABSTRACT

The device for braking an electric drive motor of a hand-held working tool has a safety brake for an immediate stopping of the working tool and an independent mechanical brake for coasting the working tool to a stop after switching off the drive motor. The mechanical brake acts on a rotational part connected to the drive motor and is activated when a switch element for activating the drive motor is released.

11 Claims, 2 Drawing Sheets

BRAKE SYSTEM WITH TWO INDEPENDENT MECHANICAL BRAKES

BACKGROUND OF THE INVENTION

The present invention relates to a device for braking an electric drive motor of a hand-held working tool, especially of a chain saw, comprising a safety brake for immediately stopping the working tool and an independent coasting brake for coasting the working tool to a stop after switching off the drive motor.

It is known from devices of the prior art for hand-held working tools, especially for portable electric chain saws, to provide two independent brake systems consisting of a mechanical as well as an electrically operated brake.

For example, from German Offenlegungsschrift 35 30 685 a brake system with two independently operating brakes is known. A mechanical brake system serves as a safety brake and after actuation brings the chain of the chain saw to a standstill within a very short time. The second brake system is an electric coasting brake which speedily stops the chain of the chain saw upon release of the on-switch, but within a considerably longer amount of time as compared to the safety brake. The electric braking is carried out by reversing the polarity of a field coil and by short-circuiting with the rotor coil.

The known brake systems have the disadvantage that the electric coasting brake is of a complicated construction and is thus expensive to manufacture.

When using an electric coasting brake, it is desired, on the one hand, to bring the chain to a standstill within a shortest possible amount of time which requires high braking current and thus a sufficiently large dimensioning of the drive motor acting as the brake. On the other hand, for limiting these currents while simultaneously providing effective braking, a complicated electric control circuit must be realized which is also expensive.

Furthermore, upon reversing polarity of the electric motor for switching from drive mode to braking mode an electric arc results within the switch for reversing polarity which can irritate or distract the operator and can result in dangerous situations.

It is therefore an object of the present invention to provide a coasting brake that is comprised of few components and provides a high functional reliability with minimum wear.

SUMMARY OF THE INVENTION

The device for braking an electric drive motor of a hand-held working tool according to the present invention is primarily characterized by:

A safety brake for an immediate stopping of the working tool;

An independent mechanical coasting brake for coasting the working tool to a stop after switching of the drive motor;

The mechanical coasting brake acting on a rotational part connected to the drive motor;

The mechanical coasting brake being activated when a switch element for activating the drive motor is released.

Preferably, the rotational part is a component of the safety brake. Expediently, the rotational part is a brake drum.

Advantageously, the safety brake acts on one side of the brake drum and the mechanical coasting brake acts on the other side of the brake drum. Preferably, one side of the brake drum is either the inner or outer mantle surface and the other side is either the inner or outer mantle surface. It is also possible that the one and the other side are opposite ends of the inner or outer mantle surface.

In a preferred embodiment of the present invention, the mechanical brake is a shoe brake biased in a braking direction.

Preferably, the shoe brake comprises a brake lever and a spring acting on the brake lever.

In a preferred embodiment of the present invention the switch element of the drive motor comprises a transmission lever, the brake lever is connected to the transmission lever of the switch element, and the transmission lever acts in a direction counter to the spring.

Advantageously, the switch element also comprises a connecting lever and the transmission and connecting levers form a one-part linkage.

Expediently, the brake lever has a first curved part and a second part and is pivotable about a pivot axis, wherein the first curved part has connected thereto a brake shoe.

Preferably, the pivot axis extends parallel at a distance to the central axis of the brake drum within the radius of the brake drum.

Advantageously, the one part linkage is pivotably supported at a pivot axis.

Preferably, a length of the transmission lever is different from a length of the connecting lever.

In another embodiment of the present invention, the brake drum has an open end covered by a housing cover of the working tool, wherein the brake drum is rotatable relative to the housing cover.

According to the present invention in addition to the fast-working safety brake a second mechanically operating brake system in the form of a mechanical coasting brake is provided for bringing the working tool to a stop after switching off the drive motor, whereby the coasting brake begins its braking action upon release of a switch element for switching on the drive motor and acts on a rotational part that is drivingly connected to the drive motor.

Advantageously, the braked rotational part of the coasting brake can be the same part upon which the fast-acting safety brake acts also. The use of one brake part for both brake systems reduces costs and increases the functional safety.

The braked rotational part preferably can be in the form of a brake drum which at its open end is covered by a non-rotating housing cover. The brake drum is connected with a rotating component of the drive motor. The enclosure of the brake drum with the housing cover is advantageous with respect to protecting safety-relevant components of the brake systems. The brake components positioned within the brake drum are thus better protected against soiling and corrosion.

The two mechanical brake systems, i.e., the safety brake and the mechanical coasting brake, act advantageously on different sides of the brake drum. Preferably, one brake system can act on the outer mantle surface and the other brake system can act on the inner mantle surface of the brake drum. It may also be advantageous to arrange the two brake systems opposite to one another on the same side, i.e., the inner or outer mantle surface, of the brake drum.

In a preferred embodiment of the present invention, the coasting brake is a shoe brake that upon turning off the electric motor is loaded such that it acts in a braking manner on the brake drum. The loading of the shoe brake is preferably achieved with a spring that acts on a free end of the brake lever of the shoe brake.

Advantageously, a transmission lever of the switch element of the drive motor acts on the free end of the brake lever of the shoe brake such that the actuation of the switch element resulting in the working tool being operated causes a release of the shoe brake via the transmission lever. The movement of the switch element carried out by an operator is transmitted via a connecting lever to the transmitting lever.

An expedient embodiment is comprised of a one-part switching element (one-part linkage) which is essentially in the form of a slide and switches on the motor by a translatory movement simultaneously releasing the braking action of the mechanical coasting brake.

In another advantageous embodiment it is suggested that the brake lever of the shoe brake is provided at its lower end with a brake shoe and brake lining which for replacing the brake lining can be easily removed and reinstalled on the brake lever.

Preferably, the shoe brake is arranged such that its pivot point is parallel to and placed at a distance to the rotational axis of the brake drum and within the radius of the brake drum.

The switch element including the connecting lever and the transmission lever, which constitutes the operational connection to the brake lever, is advantageously designed such that the connecting lever to be moved by the operator has a greater length than the transmission lever connected to the brake lever. According to the physical laws regarding levers the switch element can thus be operated without much force and with great sensitivity by the operator.

BRIEF DESCRIPTION OF THE DRAWINGS

The object and advantages of the present invention will appear more clearly from the following specification in conjunction with the accompanying drawings. The drawings show as an exemplary embodiment two mechanical brake systems for an electrically operated chain saw which advantageously have only one central brake element, i.e., the brake drum, for both brake systems. It is shown in.

DESCRIPTION OF PREFERRED EMBODIMENTS

Figure 1:
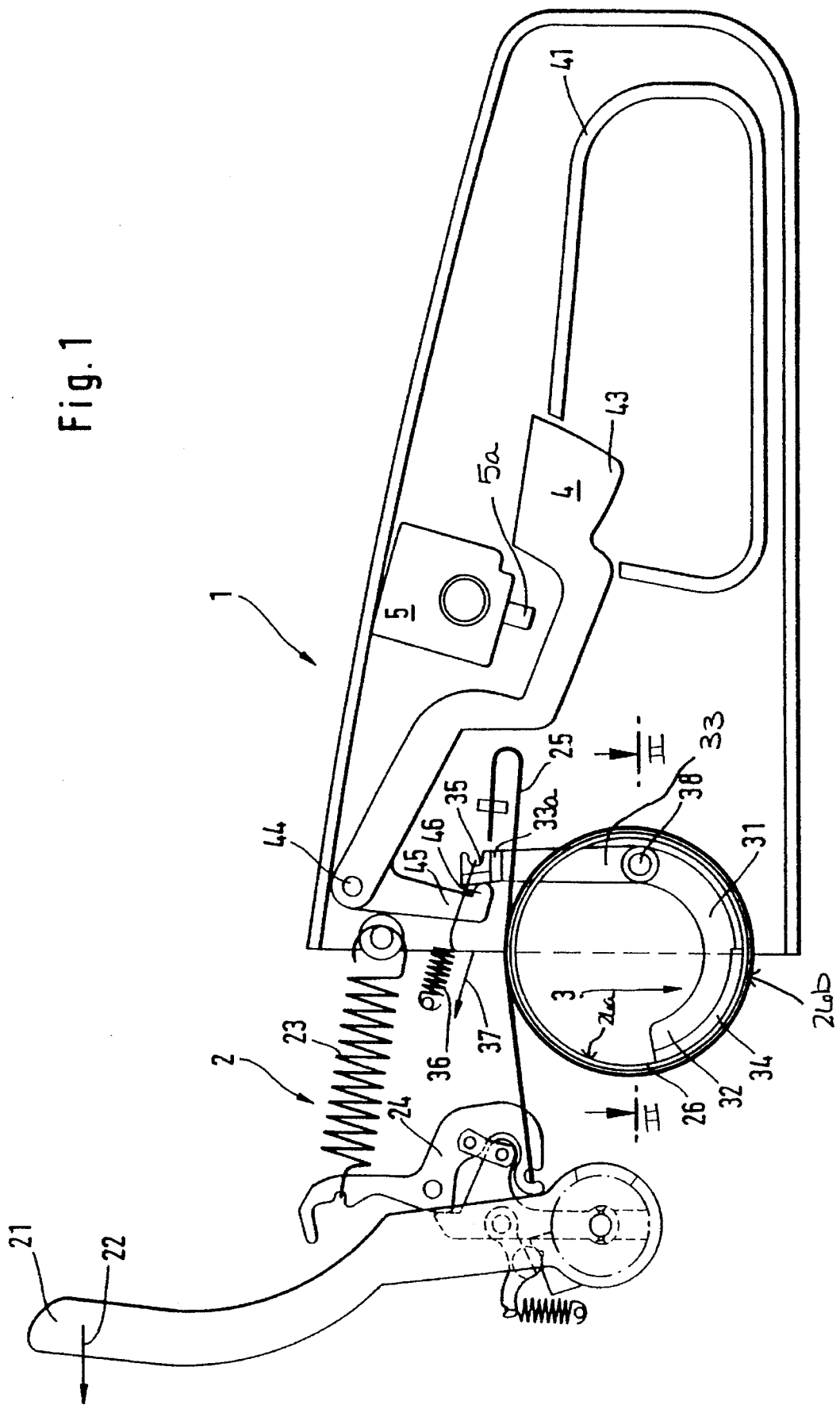
FIG. 1 a schematic side view of the chain saw with the inventive two mechanical brake systems.
Figure 2:
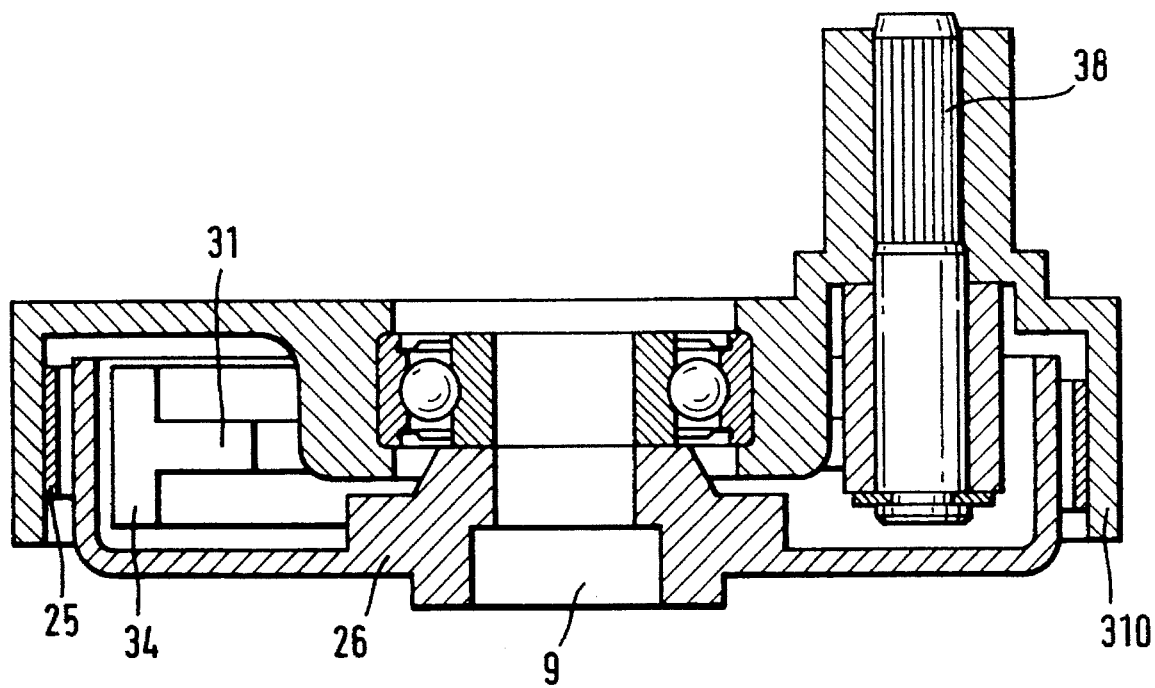
FIG. 2 a section along the line II—II of the brake drum including the adjacently positioned brake band.

The working tool, i.e., the motor chain saw 1, has a first handle 41 as well as a further non-represented second handle with a protective cover 21. The chain saw is held by the operator with these two handles. When the protective cover 21 is moved forwardly in direction of arrow 22, which can occur upon a sudden rebound movement of the chain saw, the elbow joint 24 is moved into the represented position so that the safety brake is activated and the brake band is applied to the outer mantle surface 26b of the brake drum 26. The movement of the elbow joint 24 results in the brake spring 23 acting via an elbow lever on the brake band 25. The brake band 25 surrounding the brake drum is contracted by the movement of the brake drum 26 such that a high braking force is generated which within a period of time of approximately 150 ms stops completely the chain saw. The release of the band brake 25 is carried out by returning the protective cover 21 into the initial position counter to the direction of arrow 22 of FIG. 1 so that the elbow joint 24 is stretched and the spring 23 is tensioned.

The opening 39 of the brake drum 26 is designed for receiving a rotating component connected to the drive motor, for example, to the drive shaft of the sprocket wheel or the output shaft of the motor. Any braking action onto the brake drum 26 thus also acts on the chain of the chain saw.

For the mechanical coasting brake 3 which is preferably in the form of a drum brake, an interior shoe brake 31 is positioned within the brake drum 26. The shoe brake 31 is substantially in the form of a hook 32, 33 whereby the lower, substantially semi-circular part 32 of the hook has a brake shoe 34 connected thereto and is adapted to the radius of the interior of the brake drum 26. The brake lever 32, 33 of the shoe brake 31 is rotatably connected to a bolt 38 that is fixedly connected to the housing cover 310. The bolt 38 is basically arranged at a transition between the lower semi-circular part 32 and the upper straight part 33 of the shoe brake 31. At the upper end 33a of the straight part 33 which projects from the brake drum 26, a recess 35 is provided into which a spring element 36 is hooked. The spring element 36 is provided with a prestress that results in a permanent tension in direction of arrow 37 onto the upper end 33a of the shoe brake 31 so that the brake shoe 34 is permanently pressed against the inner mantle surface 26a of the brake drum 26 and continuously exerts a braking power.

Advantageously, the brake shoe 34 connected to the lower part 32 of the shoe brake 31 has a cross-section that is wider than the brake lever of the shoe brake 31 so that the brake force is distributed over a large surface area of the brake drum 26 in order to more easily dissipate the frictional heat generated by the braking action.

The shoe brake 31 is only released when the chain saw is started up with the switch element 4. For this purpose, the connecting lever 43 of the switch element 4 that extends into the free space of the handle 41 is upwardly displaced. This movement is imparted by pivoting about the axis 44 onto the shorter transmission lever 45 that acts via the cam 46 onto the upper part 33 of the shoe brake 31. The connecting lever 43 and the transmission lever 45 are preferably a one-part linkage, acting essentially as a slide. The resulting movement is counter to the force of the spring element 36 and causes the lower part 32 of the shoe brake 31 to be removed from its braking position.

This demonstrates that the mechanical coasting brake 3 is continuously applied except when the chain saw is being operated with the aid of the switch element 4.

The part of the connecting lever 43 extending into the free space of the handle 41 is considerably longer than the transmission lever 45 at the end 46 of which the movement of the switch element 4 is transmitted to the shoe brake 31. This results in a favorable lever ratio so that the switch element 4 can be upwardly displaced with a small expenditure of force by the hand of the operator and can also be easily adjusted in a desired position. On the other hand, the return force of the spring element 36 causes the switch element 4 to be displaced downwardly into its initial position when no external force acts on the switch element 4.

The chain saw is switched on by pressing onto the main switch 5 which is arranged above the switch element 4. The switch pin 5a of the switch S is to be actuated by the switch element 4.

The present invention is, of course, in no way restricted to the specific disclosure of the specification and drawings, but also encompasses any modifications within the scope of the appended claims.

What we claim is:

1. A device for braking an electric drive motor of a hand-held working tool, said device comprising:

a safety brake for an immediate stopping of the working tool;

an independent mechanical coasting brake for coasting the working tool to a stop after switching off the drive motor;

said mechanical coasting brake acting on a rotational part connected to the drive motor;

said mechanical coasting brake being activated when a switch element for activating the drive motor is released;

wherein said rotational part is a component of said safety brake and is a brake drum; and wherein said safety brake acts on one side of said brake drum and said mechanical coasting brake acts on the other side of said brake drum.

2. A device according to claim 1, wherein said one side is an outer mantle surface of said brake drum and said other side is an inner mantle surface of said brake drum.

3. A device according to claim 1, wherein said mechanical coasting brake is a shoe brake biased in a braking direction.

4. A device according to claim 3, wherein said shoe brake comprises a brake lever and a spring acting on said brake lever.

5. A device according to claim 4, wherein:

said switch element of the drive motor comprises a transmission lever;

said brake lever is connected to said transmission lever of said switch element; and said transmission lever acts in a direction counter to said spring.

6. A device according to claim 5, wherein:

said switch element comprises a connecting lever; and said transmission lever and said connecting lever form a one-part linkage.

7. A device according to claim 6, wherein said one-part linkage is pivotably supported at a pivot axis.

8. A device according to claim 6, wherein a length of said transmission lever is different from a length of said connecting lever.

9. A device according to claim 4, wherein said brake lever comprises a first curved part and a second part and is pivotable about a pivot axis, said first curved part having connected thereto a brake shoe.

10. A device according to claim 9, wherein said pivot axis extends parallel at a distance to a central axis of said brake drum within a radius of said brake drum.

11. A device according to claim 1, wherein said brake drum has an open end covered by a housing cover of the working tool and wherein said brake drum is rotatable relative to said housing cover.

* * * * *